US006707777B1

(12) United States Patent  (10) Patent No.: US 6,707,777 B1
Cherry  (45) Date of Patent: Mar. 16, 2004

(54) TOY BOX CAPABLE OF EMITTING PRE-RECORDED MESSAGES

(76) Inventor: Kazuko Cherry, 971 Beech Chapel Rd., Union City, TN (US) 38261

( * ) Notice: Subject to any disclaimer, the term of this patent is extended or adjusted under 35 U.S.C. 154(b) by 0 days.

(21) Appl. No.: 10/384,681

(22) Filed: Mar. 11, 2003

(51) Int. Cl.[7] .......................... G11B 31/00; A63H 3/00; A63H 5/00; G09B 19/04
(52) U.S. Cl. ......................... 369/63; 369/68; 446/73; 446/270; 434/185
(58) Field of Search ................. 369/63, 68; 446/73, 446/270; 312/212; 434/185, 156; D6/440, 434, 450, 435, 452, 453; D3/294

(56) References Cited

U.S. PATENT DOCUMENTS

D245,228 S    8/1977   Gilson et al.
4,103,455 A *  8/1978   Silvey .......................... 446/73
4,200,197 A    4/1980   Meyer et al.
4,715,840 A   12/1987   Swift
5,332,605 A    7/1994   DeLamar

FOREIGN PATENT DOCUMENTS

DE    29621779 U1  *  2/1997    .......... A63H/37/00
JP    2001252481 A  *  9/2001    .......... A63H/33/30

* cited by examiner

Primary Examiner—William Klimowicz
(74) Attorney, Agent, or Firm—Richard L. Mikesell

(57) ABSTRACT

A toy box includes a lid pivotally attached to a base so as to define an internal cavity which can store one or more toys therein. An audio box is disposed within the cavity for transmitting pre-recorded audio messages through a speaker which encourages the placement of toys within the cavity. A sensor is electronically connected to the audio box for activating the audio box upon a predetermined event, such as the detection of light by the opening of the lid, or placement of toys within the cavity.

2 Claims, 1 Drawing Sheet

FIG. 1
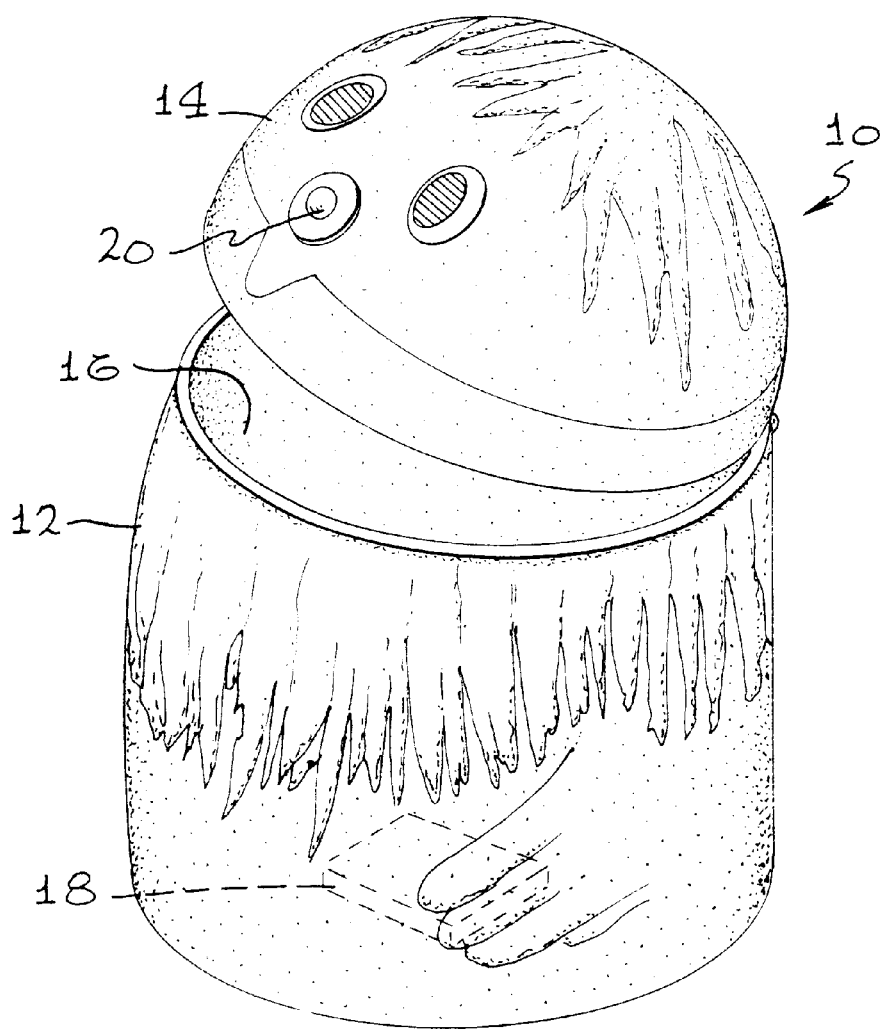
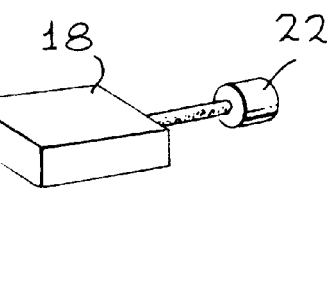
FIG. 2

TOY BOX CAPABLE OF EMITTING PRE-RECORDED MESSAGES

BACKGROUND OF THE INVENTION

The present invention generally relates to toy boxes. More particularly, the present invention relates to a toy box which is capable of emitting pre-recorded messages which encourage the placement of toys therein.

The placement of toys in bins and toy boxes is well-known. Many toy boxes are comprised of shapes or designs which are very pleasing to the child. For example, in U.S. Pat. No. 4,200,197 to Meyer et al., an animated toy box is disclosed wherein a foot comprising a pedal may be depressed in order to open a lid of the toy box which appears to open a mouth of an animal caricature. U.S. Pat. No. Des. 245,228 also discloses a storage container having an animal appear. Such toy boxes are intended to encourage the child to place toys therein.

However, there is a continuing need for toy boxes which encourage the placement of toys therein by the child. The present invention fulfills this need and provides other related advantages.

SUMMARY OF THE INVENTION

The present invention resides in a toy box which is capable of emitting pre-recorded messages which encourage the placement of toys therein. The toy box is comprised of a base having a lid pivotally attached thereto. The base and lid cooperatively define an internal cavity configured to store toys therein. Preferably, the base and lid are decorated as a caricature.

An audio box is disposed within the cavity for transmitting pre-recorded audio messages through a speaker. A switch may be used to selectively power the audio box. In the particularly preferred embodiment, the switch is comprised of a depressible button or the like which extends through a nose of the caricature.

A sensor is electronically connected to the audio box for activating the audio box upon a predetermined event. Preferably, the sensor comprises an optical sensor for activating the audio box upon the detection of light or the placement of toys within the cavity.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a perspective view of a toy box embodying the present invention; and

FIG. 2 is a perspective view of an audio box having a sensor and switch and used in accordance with the present invention.

DETAILED DESCRIPTION OF THE PREFERRED EMBODIMENT

As shown in the drawings for purposes of illustration, the present invention resides in a toy box 10 which is capable of emitting pre-recorded messages. The toy box 10 is comprised of a base 12 having a lid 14 pivotally attached thereto. The base and lid 12 and 14 define an internal cavity 16 which is sized and configured to receive at least one toy, and preferably a plurality of toys therein. The toy box can be comprised of any suitable material, such as plastic, wood, etc. In a particularly preferred embodiment, the toy box 10 is comprised of a plastic which is imprinted or molded so as to illustrate a caricature which is desirable to the child. Such caricatures could comprise characters found on early morning cartoon or television shows, for example.

Disposed within the cavity 16 is an audio box 18 having a speaker either built therein or attached thereto. The audio box 18 includes pre-recorded messages such as "I am hungry, feed me your toys", or other messages encouraging the placement of toys within the cavity. Such voice recording message boxes are readily available. The voice could imitate the persona of the caricature defined by the toy box 10.

A switch 20 is electrically connected to the audio box 18 for either activating the audio box 18 to emit its pre-recorded message, or to selectively power on and off the audio box 18. In a particularly preferred embodiment, the switch 20 comprises a depressible button switch which extends through a nose of the caricature, as illustrated in FIG. 1. In this manner, a parent could depress the button switch 20 to activate the audio box 18 to emit the message to encourage the child to place toys therein.

In a particularly preferred embodiment, a sensor 22 is electrically and conductively connected to the audio box 18 so that upon the occurrence of a predetermined event, such as the opening of the lid 14, movement adjacent to the toy box 10, etc., the audio box 18 is activated and emits the pre-recorded message(s). In a particularly preferred form, the sensor 22 comprises an optical sensor such that when the lid 14 is opened, light is detected and the pre-recorded messages are emitted. The optical sensor 22 could also detect the placement of toys within the cavity 16 such that the pre-recorded messages are emitted thus encouraging the child to further place toys within the toy box 10.

Although several embodiments have been described in some detail for purposes of illustration, various modifications may be made without departing from the scope and spirit of the invention. Accordingly, the invention is not to be limited, except as by the appended claims.

What is claimed is:

1. A toy box capable of emitting pre-recorded messages, comprising:

a base;

a lid pivotally attached to the base, the base and lid cooperatively defining an internal cavity configured to store one or more toys therein, wherein the lid and base are decorated as a caricature;

an audio box disposed within the cavity for transmitting pre-recorded audio messages through a speaker for encouraging placement of toys in the cavity;

a switch electronically connected to the audio box and extending through a nose of the caricature for selectively powering the audio box; and an optical sensor electronically connected to the audio box for activating the audio box upon the detection of light due to the opening of the lid, or placement of toys within the cavity.

2. A toy box capable of emitting pre-recorded messages, comprising:
   a base;
   a lid pivotally attached to the base, the base and lid cooperatively defining an internal cavity configured to store one or more toys therein;
   the base and lid decorated as a caricature;
   an audio box disposed within the cavity for transmitting pre-recorded audio messages through a speaker:
   a switch comprised of a depressible button extending through a nose of the caricature for selectively powering the audio box, and
   a sensor electronically connected to the audio box for activating the audio box upon a predetermined event.

* * * * *